United States Patent
Cook, Jr.

[15] 3,650,650
[45] Mar. 21, 1972

[54] SAFETY MECHANISM FOR A PLASTICS INJECTION-MOLDING MACHINE

[72] Inventor: Francis W. Cook, Jr., Newington, Conn.
[73] Assignee: The New Britain Machine Company, Britain, Conn.
[22] Filed: May 15, 1969
[21] Appl. No.: 825,010

[52] U.S. Cl. ..................... 425/153, 425/DIG. 45, 100/53, 425/214
[51] Int. Cl. ........................................ B29f 1/00, B29c 3/00
[58] Field of Search .................. 18/30 CS, 45; 74/612; 100/53

[56] References Cited

UNITED STATES PATENTS 2,946,277  7/1960  Archer ..................................... 100/53
3,359,598  12/1967  Bucy ................................. 18/30 CS X

FOREIGN PATENTS OR APPLICATIONS 1,100,940  3/1961  Germany ............................. 18/30 CS Primary Examiner—Robert D. Baldwin
Assistant Examiner—Michael O. Sutton
Attorney—Robert S. Smith, David S. Urey, Alan C. Rose and Alfred B. Levine

[57] ABSTRACT

A plastics injection-molding machine carries the parts of a two-part mold, supported respectively on upper and lower platens, one of which is movable toward and away from the other for clamped mating and for separation of the mold halves. Safety dogging mechanism in the form of a drop-bar is mounted to be moved selectively into and out of the path of the one movable platen, when the platens are apart, for preventing the one platen from moving toward the other. A rotatable shaft is connected to position the bar into and out of said path. A handle on the shaft is positioned to overbalance the shaft when the bar is positioned in said path, thereby providing gravity-retention of the safety or blocking position.

6 Claims, 5 Drawing Figures

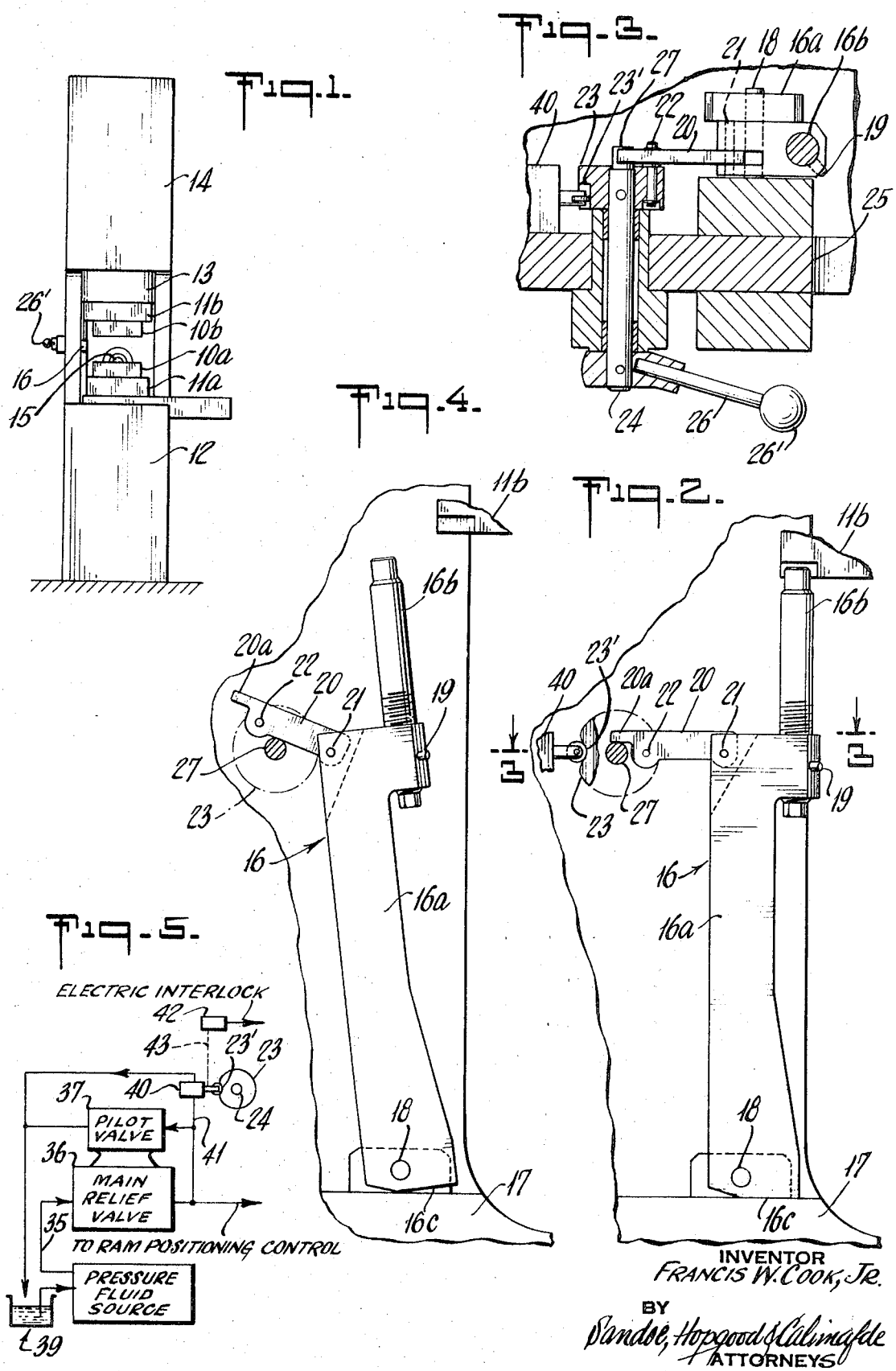

SAFETY MECHANISM FOR A PLASTICS INJECTION-MOLDING MACHINE

The present invention relates to plastics injection-molding machines and in particular to such machines in which mold-clamp action is vertical.

In machines of the character indicated, an upper mold-supporting platen is power-driven downwardly to achieve mold clamping, and the machine operator must manipulate directly beneath the retracted upper platen (and its mold part) when setting up the machine or, in certain cases, to assist in dislodging molded parts from the lower mold part. An inadvertent actuation or failure of the mold-clamp mechanism creates hazards to the operator.

It is, accordingly, an object to improve the safety of machines of the character indicated.

Another object is to achieve the foregoing object with basically simple and foolproof structure which will under no circumstances permit the unwitting descent of the upper platen.

It is a specific object to provide mechanism of the character indicated which includes a safety connection, effective to disable the supply of power to the mold-clamp mechanism.

Another object is to achieve the above objects with means having a single simple control convenient to the operator and accessible essentially only to him, so that he can know he has sole control over the upper platen while working in the hazardous mold region.

Other objects and various further features of novelty and invention will be pointed out or will occur to those skilled in the art from a reading of the following specification in conjunction with the accompanying drawings. In said drawings, which show, for illustrative purposes only, a preferred form of the invention.

FIG. 1 is a front-elevation view of a machine incorporating the invention, with mold-clamp mechanism in retracted position so as to separate mold halves;

FIG. 2 is an enlarged fragmentary side view of safety mechanism of the invention, shown in the safety or platen-blocking position;

FIG. 3 is a fragmentary sectional view generally in the plane 3—3 of FIG. 2;

FIG. 4 is a view similar to FIG. 2 to show the mechanism in its other position, clear of interference with platen operation; and FIG. 5 is a simplified diagram to illustrate safety interlock of my mechanism with the platen-control means.

Briefly stated, the invention contemplates the provision of selectively positionable means, referenced to the machine frame, for mechanically dogging the upper platen when in its raised position. The positioning means is positive. It can be operated only deliberately by the operator, and no other powered operation of the machine is possible as long as the mechanism is in dogging position.

Referring to FIG. 1, in a plastics injection-molding machine of the type under consideration, mold halves 10a and 10b are mounted respectively on platens 11a and 11b. The platen 11a, and the mold half 10a, thereon, are mounted in relatively fixed vertical position on the machine base, indicated at 12. The upper platen 11b, and mold half 10b thereon, are moved vertically down and up by the hydraulic ram 13 of mold-clamp mechanism 14. Ram 13 is vertically actuated in a first direction to bring the mold half 10b down into clamped mating relation with the mold half 10a for a molding operation, and then in the opposite direction to lift and separate the upper mold-half 10b from the lower mold-half 10a to permit removal of the molded article. When the mold halves 10a and 10b are in clamped mating relation, plasticized molding composition is injected into the mold at an injection nozzle 15. The nozzle 15 will be understood to schematically indicate plasticizing and injection means, as of the rotary reciprocating-screw variety, which may be carried by the frame 12 rearwardly of the parts shown in FIG. 1, and which therefore only shows in FIG. 1 as the nozzle end of the injection mechanism.

Referring now to FIGS. 2 to 4, safety platen-dogging means of the invention includes an upstanding bar 16 having its bottom end pivotally mounted at 18 to a lower frame member 17 of the machine. The bar 16 is thus mounted for its upper end to be swung into or out of the vertical path of movement of the upper platen 11b when this platen is in its upper or retracted position, i.e., when the respective platens are separated.

The bar 16 is shown in two parts, a main-body portion, 16a, the bottom of which is pivoted on the frame member 17, and an upper extension-bar portion 16b which is adjustably held, as by screw-threaded engagement into the upper end of the main-body portion 16a. The extent of such threaded engagement determines the adjusted position at which the stop-bar 16 is adapted to halt downward movement of the platen 11b, and a set screw 19 holds the adjustment.

As shown in FIG. 2, the upper extension-bar portion 16b is offset from the main body portion 16a of the bar 16 to facilitate mounting the bar so that its upper end may be swung into and out of the downward path of platen 11b, and so that, when its upper end is out of the downward path of the platen 11b, the bar 16 is clear of the molding region. In the platen-dogging position of FIG. 2, a substantial flat heel portion 16c at the base end of bar 16 firmly abuts a mating flat on the frame member 17, thus dissipating directly to the frame any clamp or platen load received by the upper bar portion 16b; this arrangement will be seen to completely relieve pin 18 from the need to bear such loads.

As another feature of the invention, simple manually actuated bar-shifting means, such as the crank handle 26, is convenient to the operator when facing the mold region, as represented by the aspect of FIG. 1. The bar 16 is swung into platen-stopping position (FIG. 2) and out of platen-stopping position (FIG. 4) by a link 20 which connects a crank 23 to the bar 16 at pin 21. The crank 23 is shown as a disc with a pin for connection to link 20, and disc 23 is operated by a shaft 24 journaled to a frame member 25. The hand crank 26 is externally accessible to drive the shaft 24.

The crank and link connections are so disposed as to determine self-retaining limits of hand-crank displacement, and in the form shown the link 20 radially overlaps a reduced end part 27 of the shaft 24 so as to determine link interference with the shaft at 27 for each of two angularly spaced hand-crank positions. In the platen-dogging position of FIG. 2, a projecting tail 20a of link 20 interferes with end 27 and therefore prevents further clockwise rotation of shaft 24. In the platen-cleared position of FIG. 4, the central span of link 20 encounters end 27 which therefore prevents further counter-clockwise rotation of shaft 24. It will be noted that for both the shaft-limiting positions the link 20 has been drawn downwardly, so that gravity operates on the parts to provide a measure of self-retention of the limiting position; such retention may be enhanced by addition of off-axis mass, such as the knob 26', on hand crank 26. It will also be noted that in the safety position of FIG. 2, the centers 21–22 of link connection substantially align with the axis of shaft 24, and that this alignment is essentially normal to bar 16 and tangential to the path of movement of link connection 21 thereto; this relationship provides a dead-center linkage and, hence, maximum assurance against unwitting dislodgement of bar 16 from platen-dogging position. In other words, movement from platen-dogging position can only be effected by a deliberate manual actuation of the hand crank 26.

FIG. 5 schematically illustrates a further feature whereby the dogged position of disc 23 provides a safety interlock to vent the main relief valve in the hydraulic supply for actuating ram 13, thus preventing the application of clamping pressures to the upper platen when dogged by the FIG. 2 placement of bar 16. As shown, the high-pressure ram-operating fluid-supply line 25 includes a main relief valve 36 having a pilot valve 37 associated therewith. Pilot valve responds to the output pressure (supplied to the ram in line 38) to provide continuity of supply to line 38 as long as a given pressure level is maintained at line 38. However, if a ram-operating connection should fail, as in line 38, pilot 37 will be automatically operative to vent pressure fluid to the sump, as suggested by connection 39. The indicated platen-dogging safety interlock operates in parallel with the pressure control to pilot valve 37 to similarly vent to sump 39 whenever the parts are in the FIG. 2 relation. For this purpose, a normally open cam following valve 40 is provided in the said parallel control connection to pilot valve 37. A cam recess 23' (see FIG. 3) in disc 23 enables the follower probe of valve 40 to move to its normally open position, to thus vent and relieve the high-pressure line 38, whenever the parts are in the FIG. 2 relation. Movement of the parts to the platen-cleared position of FIG. 4 actuates valve 40 to closed position, so that normal mold-clamping action can proceed, using high-pressure fluid from supply line 38. Electrical switch means 42, mechanically tracking the same cam action at 23', as suggested at 43, may provide similar safety interlock with electrical controls for overall machine operation, thus, preventing the plasticizing or nozzle-injection functions as long as the parts are in the FIG. 2 position.

While the invention has been described in detail for a preferred form, it will be understood that modifications can be made within the scope of the claimed invention.

I claim:

1. In a plastics injection-molding machine in which one of a pair of platens for mounting mating mold halves respectively thereon is movable toward and away from the other for mating and separating said mold halves, safety drop-bar mechanism selectively operable for preventing a mating approach of the platens from their separated positions, such mechanism comprising a bar mounted on the machine in approximate axial alignment with the direction of movement of said one platen, said bar being pivotally mounted at one end on the machine for swinging movement of the bar to move its other end selectively into and out of the path of movement of said one platen when said platen is separated from the other platen for engaging the one platen and preventing it from moving toward the other, and means for selectively moving the bar into and out of said path of the one platen, said means for selectively moving the bar into and out of said path comprises a shaft rotatably supported on the machine, a crank fixed on the shaft, a link pivotally connected at one end to the crank and at the other end to the bar at a location offset from the pivotal mounting thereof, said crank and link and shaft being arranged for actuating the bar into said path by rotation of the shaft in one direction and out of said path by rotation in the opposite direction, and means for rotating the shaft selectively in opposite directions.

2. In a plastics injection-molding machine in which one pair of platens for mounting mating mold halves respectively thereon is movable toward and away from the other for mating and separating said mold halves, safety drop-bar mechanism selectively operable for preventing a mating approach of the platens from their separated positions, such mechanism comprising a bar mounted on the machine in approximate axial alignment with the direction of movement of said one platen, said bar being pivotally mounted at one end on the machine for swinging movement of the bar to move its other end selectively into and out of the path of movement of said one platen when said platen is separated from the other platen for engaging the one platen and preventing it from moving toward the other, and means for selectively moving the bar into and out of said path of the one platen, said means for selectively moving the bar into and out of said path comprises a shaft supported on the machine for rotation in a plane at right angles to and spaced from the plane of movement of the bar, a crank fixed on the shaft, a link pivotally connected to the crank at one end with its other end pivotally connected to the bar at a location offset from the pivotal mounting thereof, said crank and link and shaft being arranged for actuating the bar into said path by rotation of the shaft in one direction and out of said path by rotation in the opposite direction, stop means limiting the pivotal movement of the bar into said path at a predetermined point therein, and a handle for rotating said shaft, said handle being of such mass, eccentric to the shaft and being so angularly attached to said shaft as to overbalance the shaft in said one direction when the bar has been positioned into said path, thereby holding the bar in the path-blocking position determined by said stop means.

3. The mechanism in accordance with claim 2, in which said stop means comprises a projection on the crank-connected end of said link, said projection extending outward from said end in position to be brought into engagement with a portion of said shaft when the shaft is rotated in the direction to position the bar in the path-blocking position, which engagement prevents further rotation of the shaft in the latter direction.

4. The mechanism in accordance with claim 2, which includes stop means for limiting the pivotal movement of the bar when it reaches a predetermined point clear of said path.

5. The mechanism of claim 4, in which said second stop means is provided by so connecting the link to the crank that the crank radially overlaps a part of the shaft, and such that the bar is in platen-clearing position when the shaft is rotated to the point of link-interference with the shaft.

6. The mechanism of claim 2, in which the connections of said link are in substantial alignment with said shaft when arrested by said stop means; whereby the dead center relation of linked parts, in the platen-blocking position of said bar, assures removal of said bar only by deliberate actuation of said handle.

* * * * *

PO-1050
(5/69)

UNITED STATES PATENT OFFICE
CERTIFICATE OF CORRECTION

Patent No. 3,650,650          Dated March 21, 1972

Inventor(s) Francis W. Cook, Jr.

It is certified that error appears in the above-identified patent and that said Letters Patent are hereby corrected as shown below:

In the title block under Assignee, before "Britain, Conn." insert --New--.

Column 2, line 69, cancel "25" and insert --35--.

Signed and sealed this 3rd day of October 1972.

(SEAL)
Attest:

EDWARD M. FLETCHER, JR.          ROBERT GOTTSCHALK
Attesting Officer          Commissioner of Patents